(12) United States Patent
Suzuki (10) Patent No.: US 9,726,864 B2
(45) Date of Patent: Aug. 8, 2017

(54) TELECONVERTER LENS AND IMAGING APPARATUS

(71) Applicant: FUJIFILM Corporation, Tokyo (JP)

(72) Inventor: Takashi Suzuki, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 237 days.

(21) Appl. No.: 14/614,722

(22) Filed: Feb. 5, 2015

(65) Prior Publication Data

US 2015/0226942 A1    Aug. 13, 2015

(30) Foreign Application Priority Data

Feb. 7, 2014    (JP) .................................. 2014-021891

(51) Int. Cl.
*G02B 15/12*    (2006.01)
*G02B 9/38*    (2006.01)
*G02B 15/00*    (2006.01)

(52) U.S. Cl.
CPC ............... *G02B 15/12* (2013.01); *G02B 9/38* (2013.01); *G02B 15/00* (2013.01)

(58) Field of Classification Search
CPC .......... G02B 15/12; G02B 9/38; G02B 13/22
USPC ......................... 359/673, 691, 692, 748, 795
See application file for complete search history.

(56) References Cited

U.S. PATENT DOCUMENTS 7,170,689 B2    1/2007   Miyazawa 8,873,154 B2 *  10/2014  Takemoto ............. G02B 15/12
                                                   359/672
2005/0259328 A1* 11/2005 Miyazawa ............. G02B 15/10
                                                   359/673
2011/0292518 A1* 12/2011 Kim ....................... G02B 15/12
                                                   359/673

FOREIGN PATENT DOCUMENTS

| DE | 1685762 | 10/1954 |
|---|---|---|
| DE | 1120175 | 12/1961 |
| DE | 1860817 | 10/1962 |
| JP | S-55138611 U | 10/1980 |
| JP | 2003307675 A | 10/2003 |
| JP | 2004-264669 | 9/2004 |
| JP | 2005-331851 | 12/2005 |
| JP | 2008-070433 | 3/2008 |
| JP | 2012-123032 | 6/2012 |
| JP | 2013164454 A | 8/2013 |

OTHER PUBLICATIONS

German Search Report—10 2015 101 516.1—Oct. 1, 2015.
Japanese Office Action dated Feb. 8, 2017; Application No. 2014-021891.

* cited by examiner

*Primary Examiner* — Bumsuk Won
*Assistant Examiner* — Grant Gagnon
(74) *Attorney, Agent, or Firm* — Young & Thompson

(57) ABSTRACT

A teleconverter lens consists essentially of, in order from the object side: a front group having a positive refractive power; and a rear group having a negative refractive power, wherein the front group and the rear group are separated from each other by the widest air space, the front group consists essentially of one positive lens having a convex surface toward the object side, and the rear group includes, in order from the object side, at least one negative lens having a concave surface toward the image side, and at least one positive lens having a convex surface toward the object side.

15 Claims, 5 Drawing Sheets

EXAMPLE 1

TELECONVERTER LENS AND IMAGING APPARATUS

CROSS-REFERENCE TO RELATED APPLICATIONS

The present application claims priority under 35 U.S.C. §119 to Japanese Patent Application No. 2014-021891, filed on Feb. 7, 2014. The above application is hereby expressly incorporated by reference, in its entirety, into the present application.

BACKGROUND OF THE INVENTION

Field of the Invention

The present invention relates to a teleconverter lens that is attached, in particular, to the front side (object side) of an imaging lens (master lens) of an electronic camera, etc., to extend the focal length of the entire imaging lens, and an imaging apparatus provided with the teleconverter lens.

Description of the Related Art

As a so-called front teleconverter lens that is attached to the object side of an imaging lens to extend the focal length of the entire system, one configured such that the front group having a positive refractive power includes two positive lenses, as taught, for example, in Japanese Unexamined Patent Publication No. 2005-331851 (hereinafter, Patent Document 1) is known. Further, Japanese Unexamined Patent Publication Nos. 2004-264669, 2008-070433 and 2012-123032 (hereinafter, Patent Documents 2, 3 and 4, respectively) teach teleconverter lenses configured such that each of the front and rear groups includes a positive lens and a negative lens so that the chromatic aberration is corrected at each group.

SUMMARY OF THE INVENTION

In recent years, increasingly higher pixel density of solid-state image sensors, such as CCD and CMOS sensors, provided in digital cameras, video cameras, etc., demands imaging lenses having higher optical performance including successful correction of chromatic aberration. Also, on-going trend of weight reduction of such apparatuses demands higher optical performance and weight reduction of a teleconverter lens attached to a master lens. The teleconverter lens is inserted on the object side of the master lens and necessarily has a lens diameter greater than that of the master lens. It is therefore desired to achieve weight reduction and cost reduction of the teleconverter lens.

The teleconverter lenses taught in Patent Documents 1 to 4 have a configuration where the front group having a positive refractive power is formed by a plurality of lenses to thereby ensure high performance; however, forming the front group, which has a large aperture, using a plurality of lenses is disadvantageous in view of both the weight and the cost.

In view of the above-described circumstances, the present invention is directed to providing a light-weight and inexpensive teleconverter lens that ensures sufficient optical performance for use with a large image sensor, and an imaging apparatus provided with the teleconverter lens.

An aspect of the teleconverter lens of the invention is a teleconverter lens attached to the object side of a master lens, the teleconverter lens consisting essentially of, in order from the object side: a front group having a positive refractive power; and a rear group having a negative refractive power, wherein the front group and the rear group are separated from each other by the widest air space, the front group consists essentially of one positive lens having a convex surface toward the object side, and the rear group comprises, in order from the object side, at least one negative lens having a concave surface toward the image side, and at least one positive lens having a convex surface toward the object side.

It is preferred that the teleconverter lens of the invention satisfy the condition expression (1) below:

$$55 < \nu d1p \quad (1),$$

where $\nu d1p$ is an Abbe number of the positive lens of the front group.

It is preferred that the rear group comprise at least two negative lenses.

It is preferred that the front group consist essentially of one positive meniscus lens having a convex surface toward the object side.

It is preferred that the rear group consist essentially of, in order from the object side, two negative meniscus lenses each having a concave surface toward the image side, and one positive lens having a convex surface toward the object side.

It is preferred that the condition expression (2) below be satisfied:

$$3 < \nu d2n2 - \nu d2n1 \quad (2),$$

where $\nu d2n1$ is an Abbe number of a negative lens of the rear group, and $\nu d2n2$ is an Abbe number of another negative lens of the rear group positioned on the image side of the negative lens having the Abbe number represented by $\nu d2n1$.

It is preferred that the condition expression (3) below be satisfied:

$$\nu d2p < 45 \quad (3),$$

where $\nu d2p$ is an Abbe number of a positive lens having the lowest Abbe number of the at least one positive lens of the rear group.

It is preferred that the condition expression (4) below be satisfied:

$$30 < \nu d2n \quad (4),$$

where $\nu d2n$ is an Abbe number of a negative lens having the highest Abbe number of the at least one negative lens of the rear group.

It is preferred that the condition expression (5) below be satisfied:

$$0.20 < DD/DSUM \quad (5),$$

where $DD$ is a distance from the most image-side surface of the front group to the most object-side surface of the rear group, and $DSUM$ is a distance from the most object-side surface of the front group to the most image-side surface of the rear group.

It is preferred that the condition expression (1-1) below be satisfied:

$$60 < \nu d1p \quad (1\text{-}1).$$

It is preferred that the condition expression (2-1) below be satisfied:

$$9 < \nu d2n2 - \nu d2n1 \quad (2\text{-}1).$$

It is preferred that the condition expression (3-1) below be satisfied:

$$\nu d2p < 40 \quad (3\text{-}1).$$

It is preferred that the condition expression (4-1) below be satisfied:

$$35 < \nu d2n \quad (4\text{-}1).$$

It is preferred that the condition expression (5-1) below be satisfied:

$$0.28 < DD/DSUM \quad (5\text{-}1).$$

The imaging apparatus of the invention comprises the above-described teleconverter lens of the invention.

It should be noted that the expression "consisting/consist essentially of" as used herein means that the lens may include, besides the elements recited above: lenses substantially without any power; optical elements other than lenses, such as a stop, a mask, and a cover glass; and mechanical components, such as a lens flange, a lens barrel, an image sensor, and a camera shake correcting mechanism, etc.

The surface shape, and the sign (positive or negative) with respect to the refractive power of any lens including an aspheric surface among the above-described lenses are about the paraxial region.

The teleconverter lens of the invention is a teleconverter lens attached to the object side of a master lens, the teleconverter lens consisting essentially of, in order from the object side: a front group having a positive refractive power; and a rear group having a negative refractive power, wherein the front group and the rear group are separated from each other by the widest air space, the front group consists essentially of one positive lens having a convex surface toward the object side, and the rear group comprises, in order from the object side, at least one negative lens having a concave surface toward the image side, and at least one positive lens having a convex surface toward the object side. This configuration allows achieving a light-weight and inexpensive teleconverter lens that ensures sufficient optical performance for use with a large image sensor.

The imaging apparatus of the invention, which is provided with the teleconverter lens of the invention, can be configured as a light-weight and inexpensive apparatus that provides high image quality.

DESCRIPTION OF THE PREFERRED EMBODIMENTS

Figure 1:
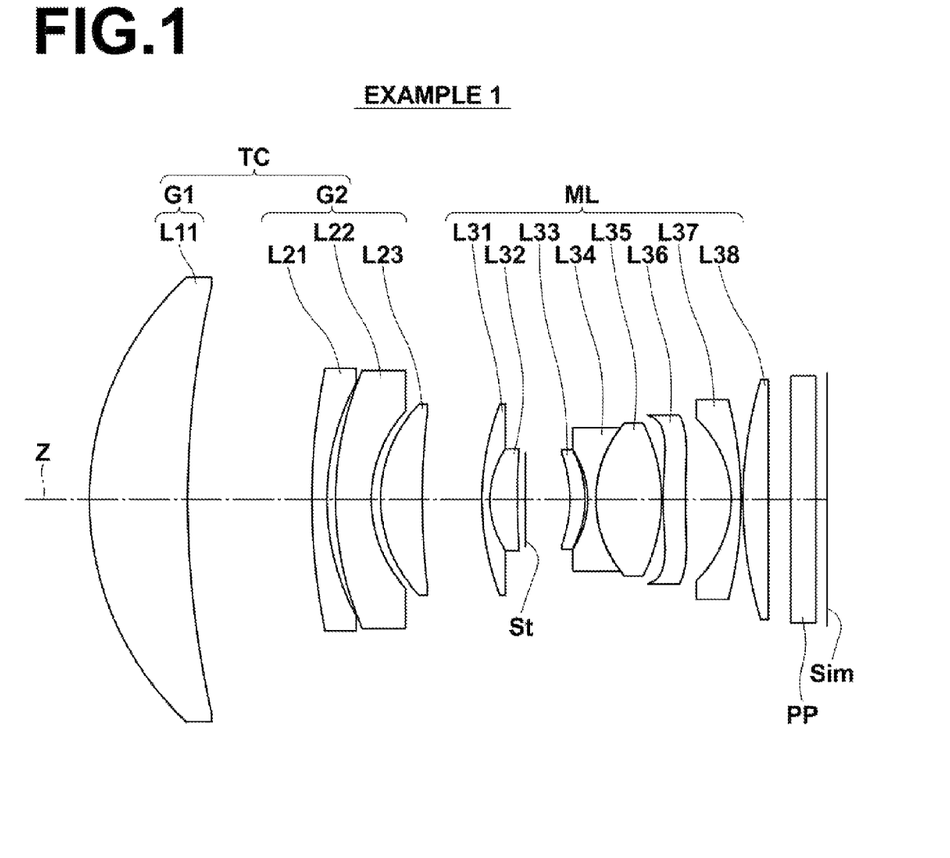
FIG. 1 is a sectional view illustrating the configuration of a teleconverter lens according to one embodiment of the invention (a teleconverter lens of Example 1)

Hereinafter, embodiments of the present invention will be described in detail with reference to the drawings. FIG. 1 is a sectional view illustrating the lens configuration of a teleconverter lens according to one embodiment of the invention. The configuration example shown in FIG. 1 is the same as the configuration of a teleconverter lens of Example 1, which will be described later. In FIG. 1, the left side is the object side and the right side is the image side. FIG. 1 also shows an example of a master lens that is combined with the teleconverter lens of this embodiment.

As shown in FIG. 1, the teleconverter lens TC is attached to the object side of the master lens ML, and consists essentially of, in order from the object side along the optical axis Z, a front group G1 having a positive refractive power, and a rear group G2 having a negative refractive power, wherein the front group G1 and the rear group G2 are separated from each other by the widest air space, the front group G1 consists essentially of one positive lens L11 having a convex surface toward the object side, and the rear group G2 includes, in order from the object side, at least one negative lens having a concave surface toward the image side, and at least one positive lens having a convex surface toward the object side.

The master lens ML to be combined with the teleconverter lens TC consists of lenses L31 to L38. When the teleconverter lens TC and the master lens ML are used with an imaging apparatus, it is preferred to provide a cover glass, a prism, various filters, such as an infrared cutoff filter and a low-pass filter, etc., between the optical system and an image plane Sim depending on the configuration of the camera on which the lens is mounted. In the example shown in FIG. 1, an optical member PP in the form of a plane-parallel plate, which is assumed to represent such elements, is disposed between the lens system and the image plane Sim.

In the teleconverter lens TC consisting of, in order from the object side, the front group G1 having a positive refractive power and the rear group G2 having a negative refractive power, the lens configurations of the front group G1 and the rear group G2 are preferably set to provide the teleconverter lens TC that has high optical performance with successfully corrected aberrations, such as spherical aberration and chromatic aberration.

Further, it is essential for the teleconverter lens TC that the positive front group G1 and the negative rear group G2 are arranged with an air space therebetween.

Forming the front group G1, which has a large aperture, using one positive lens L11 allows the cost reduction and the weight reduction.

Further, the rear group G2 including a negative lens and a positive lens allows successful correction of both of longitudinal chromatic aberration and lateral chromatic aberration.

It is preferred that the teleconverter lens of this embodiment satisfy the condition expression (1) below:

$$55 < \nu d1p \quad (1),$$

where $\nu d1p$ is an Abbe number of the positive lens of the front group. When the front group G1 is formed by one positive lens L11, satisfying the condition expression (1) allows successful correction of both of longitudinal chromatic aberration and lateral chromatic aberration with achieving successful correction of, in particular, longitudinal chromatic aberration. It should be noted that higher performance can be obtained when the condition expression (1-1) below is satisfied:

$$60 < \nu d1p \quad (1\text{-}1).$$

It is preferred that the rear group G2 include at least two negative lenses. The rear group G2 as a whole has a negative refractive power, and high performance can be obtained when it includes two or more negative lenses so that spherical aberration and field curvature are corrected using the two or more negative lenses.

It is preferred that the front group G1 consists of one positive meniscus lens L11 having a convex surface toward the object side. An aperture stop St of the master lens ML is disposed on the image side of the positive lens L11 of the front group G1, and astigmatism can be minimized when the positive lens L11 of the front group G1 is a meniscus lens having a convex surface toward the object side so that rays of light are not bent strongly relative to a change of angle of view.

It is preferred that the rear group G2 consist of, in order from the object side, two negative meniscus lenses L21 and L22 each having a concave surface toward the image side, and one positive lens L23 having a convex surface toward the object side. The aperture stop St of the master lens ML is disposed on the image side of the lenses of the rear group G2, and astigmatism can be minimized when the two negative lenses L21 and L22 of the rear group G2 are negative meniscus lenses each having a concave surface toward the image side and the positive lens L23 of the rear group G2 is a positive lens having a convex surface toward the object side so that rays of light are not bent strongly relative to a change of angle of view.

Further, it is preferred that the condition expression (2) below be satisfied:

$$3 < vd2n2 - vd2n1 \quad (2),$$

where vd2n1 is an Abbe number of a negative lens of the rear group, and vd2n2 is an Abbe number of another negative lens of the rear group positioned on the image side of the negative lens having the Abbe number represented by vd2n1. Satisfying the condition expression (2) allows maintaining good balance between longitudinal chromatic aberration and lateral chromatic aberration, which is otherwise difficult to achieve when the front group G1 is formed by one positive lens. It should be noted that even higher performance can be obtained when the condition expression (2-1) below is satisfied:

$$9 < vd2n2 - vd2n1 \quad (2-1).$$

Further, it is preferred that the condition expression (3) below be satisfied:

$$vd2p < 45 \quad (3),$$

where vd2p is an Abbe number of a positive lens having the lowest Abbe number of the at least one positive lens of the rear group. Satisfying the condition expression (3) allows maintaining good balance between longitudinal chromatic aberration and lateral chromatic aberration, which is otherwise difficult to achieve when the front group G1 is formed by one positive lens. It should be noted that even higher performance can be obtained when the condition expression (3-1) below is satisfied:

$$vd2p < 40 \quad (3-1).$$

Further, it is preferred that the condition expression (4) below be satisfied:

$$30 < vd2n \quad (4),$$

where vd2n is an Abbe number of a negative lens having the highest Abbe number of the at least one negative lens of the rear group. Satisfying the condition expression (4) allows maintaining good balance between longitudinal chromatic aberration and lateral chromatic aberration, which is otherwise difficult to achieve when the front group G1 is formed by one positive lens. It should be noted that even higher performance can be obtained when the condition expression below (4-1) is satisfied:

$$35 < vd2n \quad (4-1).$$

Further, it is preferred that the condition expression (5) below be satisfied:

$$0.20 < DD/DSUM \quad (5),$$

where DD is a distance from the most image-side surface of the front group to the most object-side surface of the rear group, and DSUM is a distance from the most object-side surface of the front group to the most image-side surface of the rear group. When the condition expression (5) is satisfied, the lenses of the rear group G2 are positioned sufficiently apart from the front group G1 to reduce the outside diameter of the rear group G2, thereby achieving the weight reduction and the cost reduction. It should be noted that even higher performance can be obtained when the condition expression (5-1) below is satisfied:

$$0.28 < DD/DSUM \quad (5-1).$$

As a material disposed on the most object side of the teleconverter lens, it is preferred to use, specifically, glass, or a transparent ceramic may be used.

In a case where the teleconverter lens is used in a harsh environment, it is preferred that the teleconverter lens be provided with a protective multi-layer coating. Besides the protective coating, the teleconverter lens may be provided with an antireflection coating for reducing ghost light, etc., during use.

In the example shown in FIG. 1, the optical member PP is disposed between the lens system and the image plane Sim. However, in place of disposing the various filters, such as a low-pass filter and a filter that cuts off a specific wavelength range, between the lens system and the image plane Sim, the various filters may be disposed between the lenses, or coatings having the same functions as the various filters may be applied to the lens surfaces of some of the lenses.

Next, numerical examples of the teleconverter lens of the invention are described.

First, a teleconverter lens of Example 1 is described. FIG. 1 is a sectional view illustrating the lens configuration of the teleconverter lens of Example 1. It should be noted that, in FIG. 1, and FIGS. 2 and 3 corresponding to Examples 2 and 3, which will be described later, the left side is the object side, and the right side is the image side. Each of these drawings also shows a master lens combined with the teleconverter lens of each example. The aperture stop St in the master lens shown in the drawings does not necessarily represent the size and the shape of the stop, but represents the position thereof along the optical axis Z.

Table 1 shows lens data of the teleconverter lens of Example 1, and Table 2 shows data about specifications of the teleconverter lens of Example 1. Table 7 shows lens data of the master lens, and Table 8 shows data about aspheric coefficients of the master lens. It should be noted that the same master lens is shown as an example in Examples 1 to 3. In the following description, meanings of symbols used in the tables are explained with respect to Example 1 as an example. The same explanations basically apply to those with respect to Examples 2 and 3.

In the lens data shown in Tables 1 and 7, each value in the column of surface number represents each surface number, where the object-side surface of the most object-side element is the 1st surface and the number is sequentially increased toward the image side, each value in the column of radius of curvature represents the radius of curvature of each surface, and each value in the column of distance represents the distance along the optical axis Z between each surface and the next surface. Each value in the column of "nd" represents the refractive index with respect to the d-line (the wavelength of 587.6 nm) of each optical element, and each value in the column of "vd" represents the Abbe number with respect to the d-line (the wavelength of 587.6 nm) of each optical element.

The sign with respect to the radius of curvature is provided such that a positive radius of curvature indicates a surface shape that is convex toward the object side, and a negative radius of curvature indicates a surface shape that is convex toward the image side. The lens data of the master lens also includes data of the aperture stop St, and the surface number and the text "(stop)" are shown at the position in the column of the surface number corresponding to the aperture stop St.

The data about specifications shown in Table 2 show values of a focal magnification, total angle of view (2ω) and f-number (Fno).

In the lens data of the master lens shown in Table 7, the symbol "*" is added to the surface number of each aspheric shape, and a numerical value of the paraxial radius of curvature is shown as the radius of curvature of each aspheric surface. The data about aspheric coefficients shown in Table 8 show the surface number of each aspheric surface and aspheric coefficients about each aspheric surface. The aspheric coefficients are values of the coefficients K and Am (where m=3, 4, 5, . . . , 20) in the formula (A) of aspheric surface shown below:

$$Zd = C \cdot h^2 / \{1 + (1 - K \cdot C^2 \cdot h^2)^{1/2}\} + \Sigma Am \cdot h^m \quad (A),$$

where Zd is a depth of the aspheric surface (a length of a perpendicular line from a point with a height h on the aspheric surface to a plane tangent to the apex of the aspheric surface and perpendicular to the optical axis), h is the height (a distance from the optical axis), C is a reciprocal of the paraxial radius of curvature, and K and Am are aspheric coefficients (where m=3, 4, 5, . . . , 20).

With respect to the lens data and data about the conditional expressions, the unit of angle is degrees, and the unit of length is millimeters; however, any other suitable units may be used since optical systems are usable when they are proportionally enlarged or reduced.

TABLE 1

Example 1 - Lens Data (n and ν are with respect to the d-line)

| Surface No. | Radius of Curvature | Distance | nd | νd |
|---|---|---|---|---|
| 1 | 34.150 | 11.03 | 1.48749 | 70.2 |
| 2 | 108.460 | 13.94 | | |
| 3 | 75.067 | 1.70 | 1.84666 | 23.8 |
| 4 | 27.749 | 0.96 | | |
| 5 | 36.827 | 4.01 | 1.69680 | 55.5 |
| 6 | 14.847 | 1.05 | | |
| 7 | 15.456 | 4.68 | 1.59270 | 35.3 |
| 8 | 84.220 | 6.70 | | |

TABLE 2

Example 1 - Specifications (d-line)

| | |
|---|---|
| Magnification | 1.384 |
| 2ω | 44.4 |
| Fno | 2.05 |

TABLE 7

Master Lens - Lens Data (n and ν are with respect to the d-line)

| Surface No. | Radius of Curvature | Distance | nd | νd |
|---|---|---|---|---|
| 1 | 29.787 | 0.91 | 1.74077 | 27.8 |
| 2 | 10.216 | 3.07 | 1.88300 | 40.8 |
| 3 | 85.567 | 0.90 | | |
| 4 (stop) | 0.000 | 5.01 | | |
| 5 | −15.211 | 1.70 | 1.88300 | 40.8 |
| 6 | −11.699 | 0.30 | | |
| 7 | −10.059 | 0.91 | 1.59270 | 35.3 |
| 8 | 13.211 | 7.36 | 1.88300 | 40.8 |
| 9 | −18.976 | 0.20 | | |
| *10 | 47.945 | 2.50 | 1.56865 | 58.6 |
| *11 | 89.234 | 5.13 | | |
| 12 | −12.593 | 1.10 | 1.80810 | 22.8 |
| 13 | −45.060 | 0.20 | | |
| 14 | 46.628 | 2.88 | 1.88300 | 40.8 |
| 15 | 0.000 | 2.50 | | |
| 16 | 0.000 | 2.80 | 1.51680 | 64.2 |
| 17 | 0.000 | | | |

TABLE 8

Master Lens - Aspheric Coefficients

| Surface No. | 10 | 11 |
|---|---|---|
| K | 0.0000000E+00 | 0.0000000E+00 |
| A3 | 1.3592650E−04 | −3.6381176E−04 |
| A4 | 3.7162356E−06 | 1.5137686E−03 |
| A5 | −6.5383916E−05 | −1.4708597E−03 |
| A6 | 1.2224508E−05 | 6.8718645E−04 |
| A7 | −6.7024023E−07 | −1.7619011E−04 |
| A8 | −7.0851318E−08 | 2.2970993E−05 |
| A9 | −1.4834043E−09 | −1.2455617E−06 |
| A10 | 4.6943650E−10 | 1.7608222E−07 |
| A11 | 7.0944713E−11 | −6.3140576E−08 |
| A12 | 4.0056802E−12 | 5.2054679E−09 |
| A13 | −2.5358331E−13 | 6.6772864E−10 |
| A14 | −6.2786396E−14 | −9.4611209E−11 |
| A15 | −7.2519329E−15 | −3.2254693E−12 |
| A16 | −6.2665147E−16 | 5.9858623E−13 |
| A17 | −1.2454499E−16 | 2.3337864E−14 |
| A18 | 7.5045399E−18 | −1.1788037E−15 |
| A19 | 9.4871080E−18 | −3.5021994E−16 |
| A20 | −7.9734604E−19 | 1.8725398E−17 |

Figure 4:
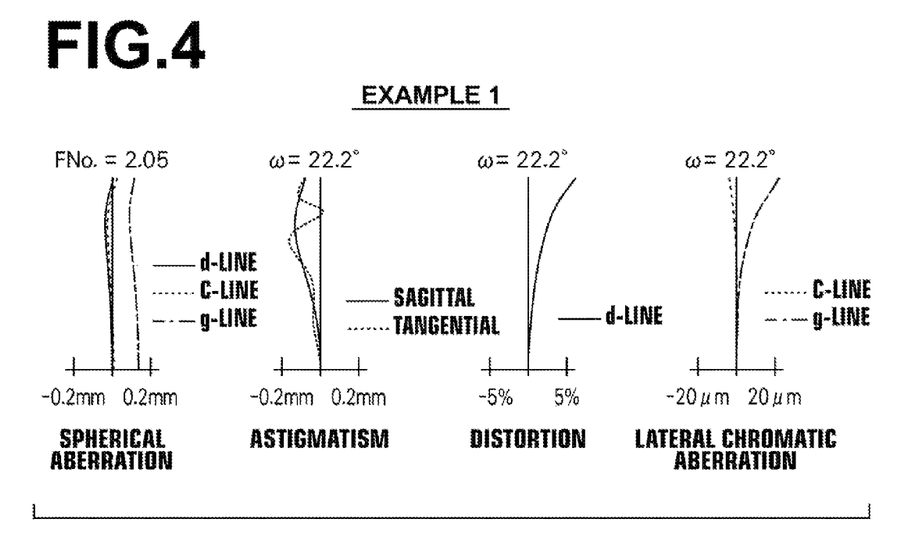
FIG. 4 shows aberration diagrams when the teleconverter lens of Example 1 of the invention is attached to a master lens.

FIG. 4 shows aberration diagrams when the teleconverter lens of Example 1 is attached to the master lens. The aberration diagrams shown in FIG. 4 are those of spherical aberration, astigmatism, distortion, and lateral chromatic aberration in order from the left side. The aberration diagrams of spherical aberration, astigmatism, and distortion show those with respect to the d-line (the wavelength of 587.6 nm), which is used as a reference wavelength. The aberration diagram of spherical aberration shows those with respect to the d-line (the wavelength of 587.6 nm), the C-line (the wavelength of 656.3 nm), and the g-line (the wavelength of 435.8 nm) in the solid line, the dotted line, and the dashed-dotted line, respectively. The aberration diagram of astigmatism shows those in the sagittal direction and the tangential direction in the solid line and the dotted line, respectively. The aberration diagram of lateral chromatic aberration shows those with respect to the C-line (the wavelength of 656.3 nm) and the g-line (the wavelength of 435.8 nm) in the dotted line and the dashed-dotted line, respectively. The symbol "Fno." in the aberration diagram of spherical aberration means "f-number", and the symbol "ω" in the other aberration diagrams means "half angle of view".

Figure 2:
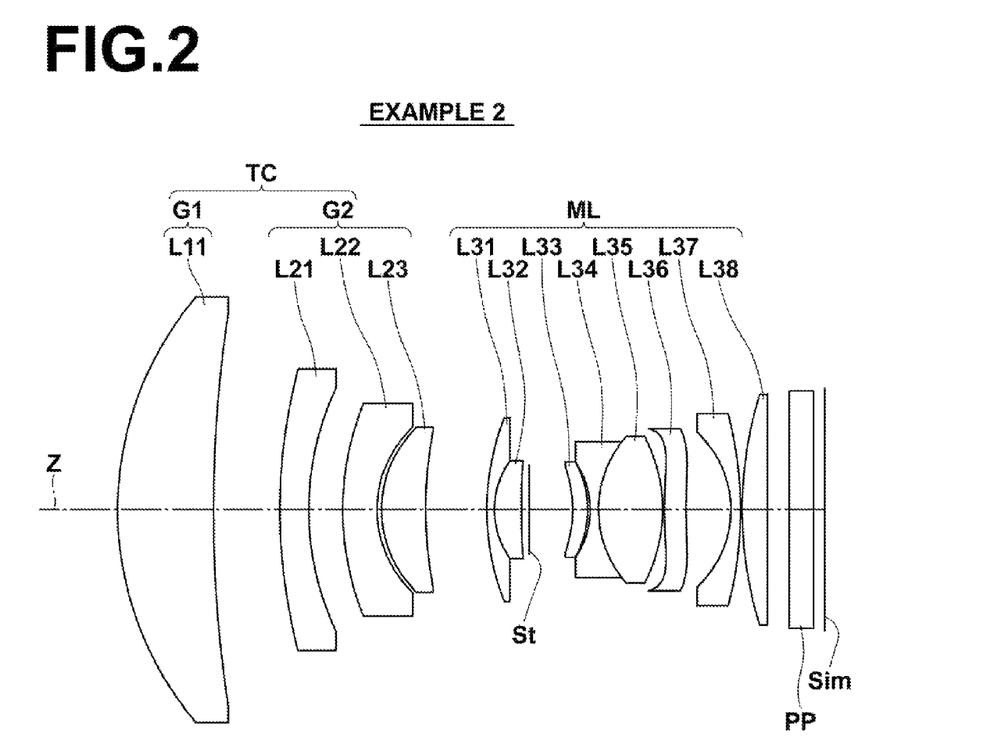
FIG. 2 is a sectional view illustrating the configuration of a teleconverter lens of Example 2 of the invention.
Figure 5:
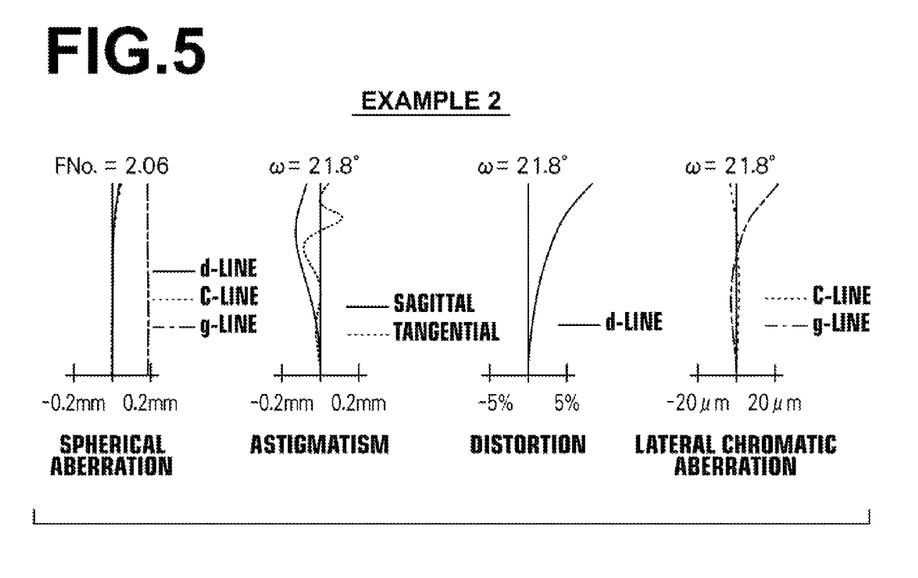
FIG. 5 shows aberration diagrams when the teleconverter lens of Example 2 of the invention is attached to the master lens.

Next, a teleconverter lens of Example 2 is described. FIG. 2 is a sectional view illustrating the lens configuration of the teleconverter lens of Example 2. Table 3 shows lens data of the teleconverter lens of Example 2, Table 4 shows data about specifications of the teleconverter lens of Example 2, and FIG. 5 shows aberration diagrams when the teleconverter lens of Example 2 is attached to the master lens.

TABLE 3

Example 2 - Lens Data (n and ν are with respect to the d-line)

| Surface No. | Radius of Curvature | Distance | nd | νd |
|---|---|---|---|---|
| 1 | 39.123 | 11.00 | 1.51680 | 64.2 |
| 2 | 157.360 | 7.60 | | |
| 3 | 66.324 | 3.30 | 1.84666 | 23.8 |
| 4 | 33.992 | 3.88 | | |
| 5 | 33.876 | 3.95 | 1.91082 | 35.3 |
| 6 | 13.566 | 0.49 | | |
| 7 | 13.632 | 5.07 | 1.67270 | 32.1 |
| 8 | 49.891 | 7.00 | | |

TABLE 4

Example 2 - Specifications (d-line)

| Magnification | 1.384 |
|---|---|
| 2ω | 43.6 |
| Fno | 2.05 |

Figure 3:
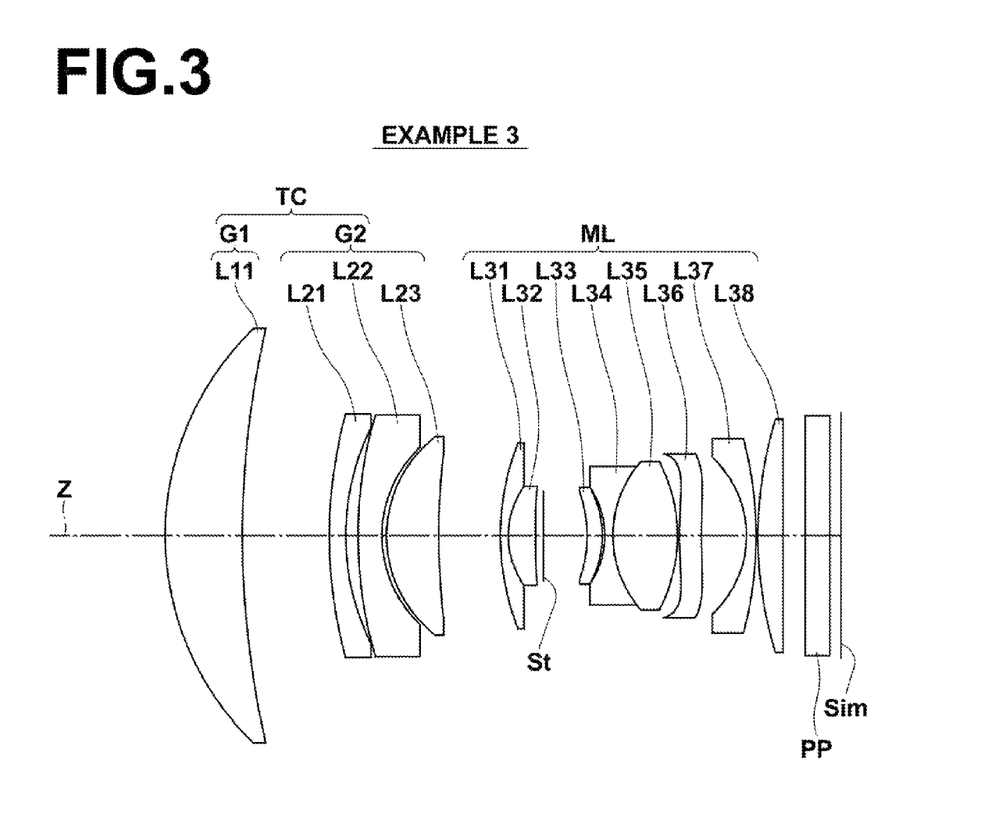
FIG. 3 is a sectional view illustrating the configuration of a teleconverter lens of Example 3 of the invention.
Figure 6:
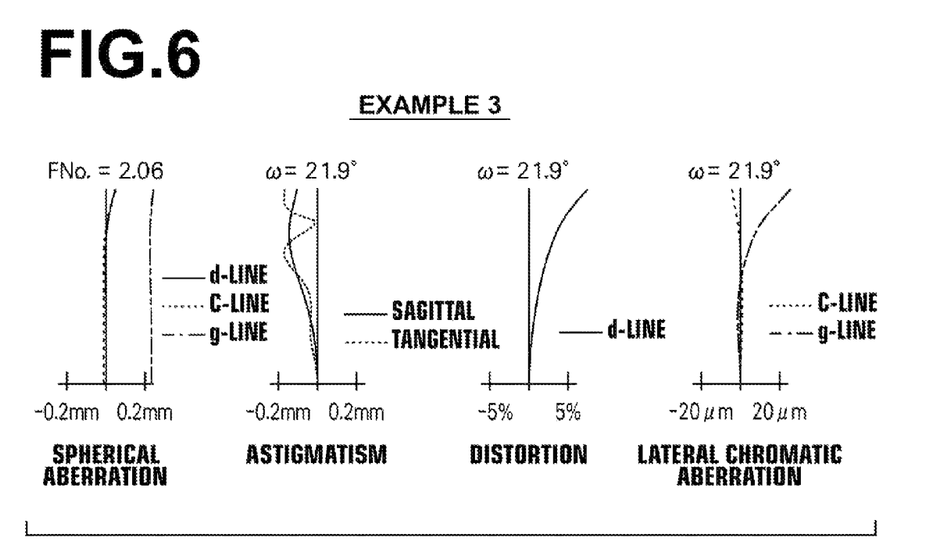
FIG. 6 shows aberration diagrams when the teleconverter lens of Example 3 of the invention is attached to the master lens.

Next, a teleconverter lens of Example 3 is described. FIG. 3 is a sectional view illustrating the lens configuration of the teleconverter lens of Example 3. Table 5 shows lens data of the teleconverter lens of Example 3, Table 6 shows data about specifications of the teleconverter lens of Example 3, and FIG. 6 shows aberration diagrams when the teleconverter lens of Example 3 is attached to the master lens.

TABLE 5

Example 3 - Lens Data (n and ν are with respect to the d-line)

| Surface No. | Radius of Curvature | Distance | nd | νd |
|---|---|---|---|---|
| 1 | 33.690 | 8.77 | 1.58913 | 61.2 |
| 2 | 109.300 | 9.88 | | |
| 3 | 55.030 | 1.88 | 1.84666 | 23.8 |
| 4 | 28.614 | 1.39 | | |
| 5 | 50.516 | 2.71 | 1.90366 | 31.3 |
| 6 | 14.373 | 0.52 | | |
| 7 | 14.697 | 5.98 | 1.71736 | 29.5 |
| 8 | 83.367 | 7.00 | | |

TABLE 6

Example 3 - Specifications (d-line)

| Magnification | 1.384 |
|---|---|
| 2ω | 43.8 |
| Fno | 2.05 |

Table 9 shows values corresponding to the condition expressions (1) to (5) of the teleconverter lenses of Examples 1 to 3. In all the examples, the d-line is used as a reference wavelength, and the values shown in Table 9 below are with respect to the reference wavelength.

TABLE 9

| No. | Condition Expression | Example 1 | Example 2 | Example 3 |
|---|---|---|---|---|
| (1) | νd1p | 70.2 | 64.2 | 61.2 |
| (2) | νd2n2 − νd2n1 | 31.7 | 11.5 | 7.5 |
| (3) | νd2p | 35.3 | 32.1 | 29.5 |
| (4) | νd2n | 55.5 | 35.3 | 31.3 |
| (5) | DD/DSUM | 0.37 | 0.22 | 0.32 |

It can be seen from the data shown above that all the teleconverter lenses of Examples 1 to 3 satisfy the condition expressions (1) to (5), and achieve a light-weight and inexpensive teleconverter lens that ensures sufficient optical performance for use with a large image sensor.

Figure 7:
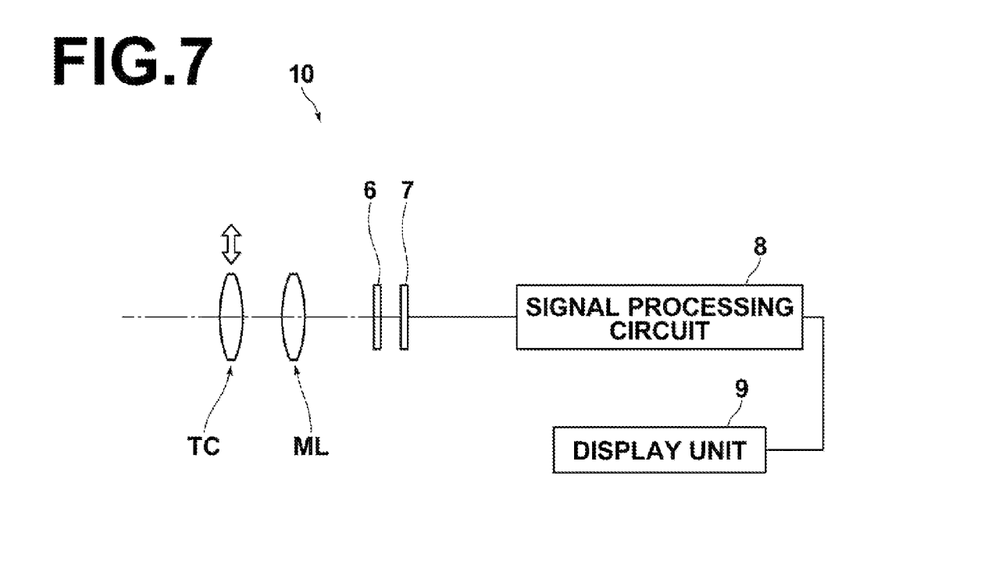
FIG. 7 is a diagram illustrating the schematic configuration of an imaging apparatus according to an embodiment of the invention.

Next, an imaging apparatus according to an embodiment of the invention is described. FIG. 7 is a diagram illustrating the schematic configuration of an imaging apparatus employing the teleconverter lens of the embodiment of the invention, which is one example of the imaging apparatus of the embodiment of the invention. It should be noted that the lens groups are schematically shown in FIG. 7. Examples of the imaging apparatus may include a video camera and an electronic still camera which include a solid-state image sensor, such as a CCD or CMOS, serving as a recording medium.

The imaging apparatus 10 shown in FIG. 7 includes: an imaging lens 1 formed by the teleconverter lens TC and the master lens ML; a filter 6 having a function of a low-pass filter, etc., disposed on the image side of the imaging lens 1; an image sensor 7 disposed on the image side of the filter 6; and a signal processing circuit 8.

The teleconverter lens TC is removably attached to the master lens ML. The image sensor 7 converts an optical image formed by the imaging lens into an electric signal. As the image sensor 7, a CCD (Charge Coupled Device) or a CMOS (Complementary Metal Oxide Semiconductor), for example, may be used. The image sensor 7 is disposed such that the imaging surface thereof is positioned in the same position as the image plane of the imaging lens. An image taken through the imaging lens is formed on the imaging surface of the image sensor 7. Then, a signal about the image outputted from the image sensor 7 is processed by the signal processing circuit 8, and the image is displayed on a display unit 9.

The present invention has been described with reference to the embodiments and the examples. However, the invention is not limited to the above-described embodiments and examples, and various modifications may be made to the invention. For example, the values of the radius of curvature, the surface distance, the refractive index, the Abbe number, etc., of each lens element are not limited to the values shown in the above-described numerical examples and may take different values.

What is claimed is:

1. A teleconverter lens attached to an object side of a master lens, the teleconverter lens consisting essentially of, in order from the object side:
a front group having a positive refractive power; and
a rear group having a negative refractive power,
wherein the front group and the rear group are separated from each other by an air space,
the front group consists essentially of one positive lens having a convex surface toward the object side, and
the rear group consists essentially of, in order from the object side, two negative meniscus lenses each having a concave surface toward an image side, and one positive lens having a convex surface toward the object side.

2. The teleconverter lens as claimed in claim 1, wherein the condition expression (1) below is satisfied:

$$55<vd1p \tag{1},$$

where vd1p is an Abbe number of the positive lens of the front group.

3. The teleconverter lens as claimed in claim 1, wherein the rear group comprises at least two negative lenses.

4. The teleconverter lens as claimed in claim 1, wherein the front group consists essentially of one positive meniscus lens having a convex surface toward the object side.

5. The teleconverter lens as claimed in claim 1, wherein the condition expression below (2) is satisfied:

$$3<vd2n2-vd2n1 \tag{2},$$

where vd2n1 is an Abbe number of a negative lens of the rear group, and vd2n2 is an Abbe number of another negative lens of the rear group positioned on the image side of the negative lens having the Abbe number represented by vd2n1.

6. The teleconverter lens as claimed in claim 1, wherein the condition expression (3) below is satisfied:

$$vd2p<45 \tag{3},$$

where vd2p is an Abbe number of a positive lens having the lowest Abbe number of the at least one positive lens of the rear group.

7. The teleconverter lens as claimed in claim 1, wherein the condition expression (4) below is satisfied:

$$30<vd2n \tag{4},$$

where vd2n is an Abbe number of a negative lens having the highest Abbe number of the at least one negative lens of the rear group.

8. The teleconverter lens as claimed in claim 1, wherein the condition expression (5) below is satisfied:

$$0.20<DD/DSUM \tag{5},$$

where DD is a distance from the most image-side surface of the front group to the most object-side surface of the rear group, and DSUM is a distance from the most object-side surface of the front group to the most image-side surface of the rear group.

9. The teleconverter lens as claimed in claim 1, wherein the condition expression (1-1) below is satisfied:

$$60<vd1p \tag{1-1},$$

where vd1p is an Abbe number of the positive lens of the front group.

10. The teleconverter lens as claimed in claim 1, wherein the condition expression (2-1) below is satisfied:

$$9<vd2n2-vd2n1 \tag{2-1},$$

where vd2n1 is an Abbe number of a negative lens of the rear group, and vd2n2 is an Abbe number of another negative lens of the rear group positioned on the image side of the negative lens having the Abbe number represented by vd2n1.

11. The teleconverter lens as claimed in claim 1, wherein the condition expression (3-1) below is satisfied:

$$vd2p<40 \tag{3-1},$$

where vd2p is an Abbe number of a positive lens having the lowest Abbe number of the at least one positive lens of the rear group.

12. The teleconverter lens as claimed in claim 1, wherein the condition expression (4-1) below is satisfied:

$$35<vd2n \tag{4-1},$$

where vd2n is an Abbe number of a negative lens having the highest Abbe number of the at least one negative lens of the rear group.

13. The teleconverter lens as claimed in claim 1, wherein the condition expression (5-1) below is satisfied:

$$0.28<DD/DSUM \tag{5-1},$$

where DD is a distance from the most image-side surface of the front group to the most object-side surface of the rear group, and DSUM is a distance from the most object-side surface of the front group to the most image-side surface of the rear group.

14. An imaging apparatus comprising the teleconverter lens as claimed in claim 1.

15. A teleconverter lens attached to an object side of a master lens, the teleconverter lens consisting essentially of, in order from the object side:
a front group having a positive refractive power; and
a rear group having a negative refractive power,
wherein the front group and the rear group are separated from each other by an air space,
the front group consists essentially of one positive lens having a convex surface toward the object side, and
the rear group comprises, in order from the object side, at least one negative lens having a concave surface toward an image side, and at least one positive lens having a convex surface toward the object side,
wherein the rear group comprises at least two negative lenses.

* * * * *